United States Patent

[11] 3,608,576

[72] Inventor Raymond L. Wilhelm
    Glendora, Calif.
[21] Appl. No. 1,215
[22] Filed Jan. 7, 1970
[45] Patented Sept. 28, 1971
[73] Assignee Circle Seal Corporation
    Anaheim, Calif.

[54] PILOT-CONTROLLED PRESSURE RELIEF VALVE
    13 Claims, 3 Drawing Figs.
[52] U.S. Cl............................................. 137/242,
                                                    137/491, 251/34
[51] Int. Cl...................................... F16k 17/10
[50] Field of Search............................................. 137/491,
    489.5, 222, 220, 245, 245.5, 244, 242; 251/34,
                                                                363

[56]              References Cited
            UNITED STATES PATENTS
2,068,102   1/1937   Gaines........................ 137/245.5
2,989,072   1/1961   Banker........................ 137/491
3,164,166   1/1965   Tennis......................... 137/491
3,318,326   5/1967   Nedulis....................... 137/491
3,330,298   7/1967   Allen........................... 137/491

Primary Examiner—M. Cary Nelson
Assistant Examiner—R. B. Rothman
Attorney—Sellers and Brace ABSTRACT: A pilot-controlled relief valve having a self-cleaning orifice past the main relief valve leading to the inlet of a pilot valve via a pressure equalizing chamber for the relief valve. A plunger movably supported in the orifice is reciprocated in one direction by the pressure drop produced upon opening of the pilot valve and in the opposite direction by the pilot valve spring, the latter being calibrated and determining the opening and closing of the relief valve proper. A resilient wiper operates during reciprocation of the plunger to clean the sidewall of the control orifice and the relief valve has self-aligning engagement with a floating valve seat.

PATENTED SEP28 1971

3,608,576

INVENTOR
RAYMOND L. WILHELM
BY
ATTORNEYS

PILOT-CONTROLLED PRESSURE RELIEF VALVE

This invention relates to pressure relief valves, and more particularly to an improved relief valve assembly utilizing a calibrated pilot valve to control the operation of the main relief valve and featuring a self-cleaning restrictive orifice between the high-pressure fluid and the inlet to the pilot valve.

The invention pressure relief valve utilizes a main relief valve capable of protecting a hydraulic or the like system against pressure surges and excess pressures quickly and in a positive manner, the relief valve being under the control of a pilot valve in series with a restrictive orifice and responsive to inlet pressure. As herein illustrated by way of example, the restrictive orifice comprises a large area bore through the main relief valve substantially closed by a loose fitting plunger movably supported therein with its remote end bearing against the pilot valve controlling the operation of the main relief valve and normally maintained seated by a calibrated spring. The exposure of the forward end of the plunger to the inlet pressure provides an authentic pressure reference for the pilot valve as contrasted with a reference pressure on the downstream side of the main relief valve which varies as some function of the inlet pressure, the valve functioning smoothly and free of any tendency to chug, chatter, or search. The narrow orifice around the plunger is normally closed by a resilient wiper ring readily dilating to permit both fluid flow and escape of particulate through the orifice and effective during reciprocation of the plunger to wipe the sidewall of the orifice clear of any sediment or particulate tending to interfere with the operation of the orifice. Opening of the pilot valve produces a high pressure differential across the orifice causing the plunger to follow the opening movement of the pilot valve, whereas closing of the pilot and main valves causes the plunger to reciprocate in the opposite direction. During both movements of the plunger the wiper acts to clean the orifice wall. Fluid flow occurring through the dilating orifice during the operating cycle of the relief valve also acts to flush away any sediment removed by the wiper. The plunger floats freely in the orifice and is held centered therein primarily by the resilient wiper and by fluid flow along the encircling narrow flow channel. The relief valve proper comprises a piston reciprocating in a close sliding fit with the valve housing and its rim edge seats against one end of an annular floating valve seat having a dynamic fluidtight seal with the valve housing.

Filters heretofore considered essential to avoid clogging of the orifice for pilot-controlled relief valve and requiring frequent inspection and cleaning are unnecessary in the invention assembly because of the dilating capability of the resilient lip seal for the restrictive orifice which dilates as necessary to pass hairlike particles or other contaminates tending to restrict flow. By reason of this self-adjusting capability, the lip seal for the restrictive orifice dilates automatically to accommodate a sudden pressure spike. Thus, if the system pressure is subjected to a sudden pressure transient, of, say, several hundred p.s.i., the orifice dilates widely quickly and transmits this pressure increase to the rear face of the main valve to maintain the pressure balance and avoiding a false and undesirable opening of the relief valve unless and until the true crack pressure is reached. This feature also renders the valve tolerant of viscosity changes due to temperature or use of the valve.

Accordingly, it is a primary object of the present invention to provide an improved pressure relief valve having a calibrated pilot control valve and a self-cleaning restrictive orifice between the pilot valve and the high-pressure side of the valve assembly.

Another object of the invention is the provision of a pilot-controlled pressure relief valve having a variable area restrictive orifice through the main valve operatively associated with self-cleaning means for the orifice which is activated upon opening and closing of the valve elements.

Another object of the invention is the provision of a pilot-controlled pressure relief valve wherein the pilot valve is aligned with the main relief valve and cooperating with a dilating and variable area restrictive orifice through the latter valve to substantially equalize the pressure on the opposite sides of the relief valve while the pilot valve remains closed, sensing directly the applied pressure, and functioning quickly upon opening of the pilot valve to release the downstream pressure on the relief valve allowing the latter to open wide very quickly.

Another object of the invention is the provision of a compact, high-precision, pilot-controlled pressure relief valve capable of use with a high range of fluid pressures and which is very rapid, positive and accurate in its operation and control function.

These and other more specific objects will appear upon reading the following specification and claims and upon considering in connection therewith the attached drawing to which they relate.

Referring now to the drawing in which a preferred embodiment of the invention is illustrated:

Figure 1:
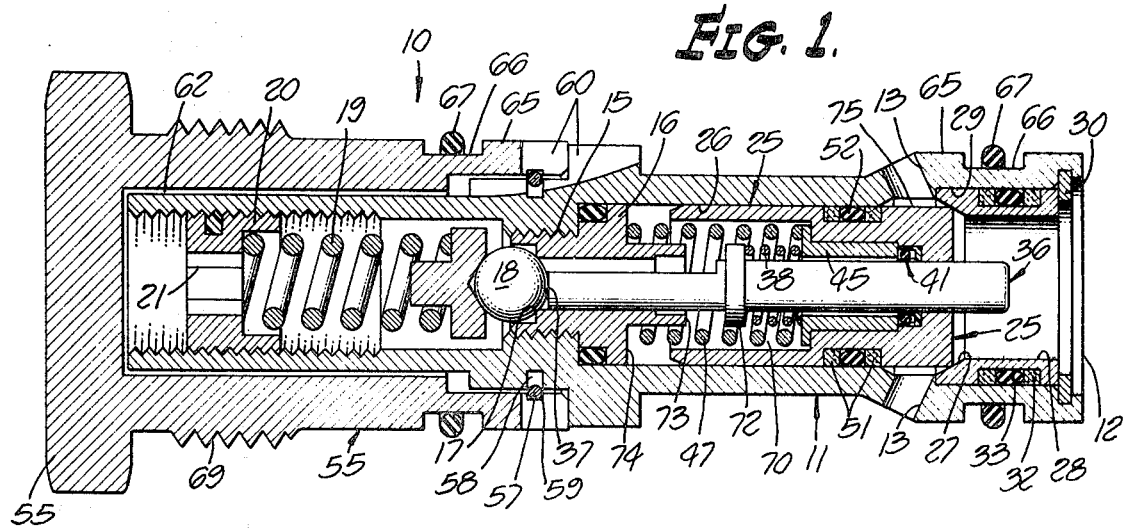
FIG. 1 is a longitudinal sectional view through one preferred embodiment of the invention valve assembly.

Referring initially and more particularly to FIG. 1, there is shown a pilot-controlled relief valve, designated generally 10, having a tubular main housing provided with a fluid inlet 12 and a plurality of fluid outlet ports 13. The midportion of the main housing has a threaded bore 15 seating a bushing 16 having a sharp-edged valve seat 17 at its left-hand end. A pilot valve 18 is held seated against this port normally by a calibrated spring 19 adjustably supported in the valve housing by a screw plug 20 provided with flow ports 21.

The main relief valve comprises a hollow piston 25 slidably supported in bore 26 with its forward rim edge seating against the seat 27 in the adjacent end of sleeve 28. This sleeve has a loose floating fit within bore 29 at the inlet end of the valve housing and is held loosely in assembled position by split ring keeper 30. A groove 31 surrounding the exterior midportion of sleeve 28 is filled with resilient packing material 32 and an O-ring 33.

Figure 2:
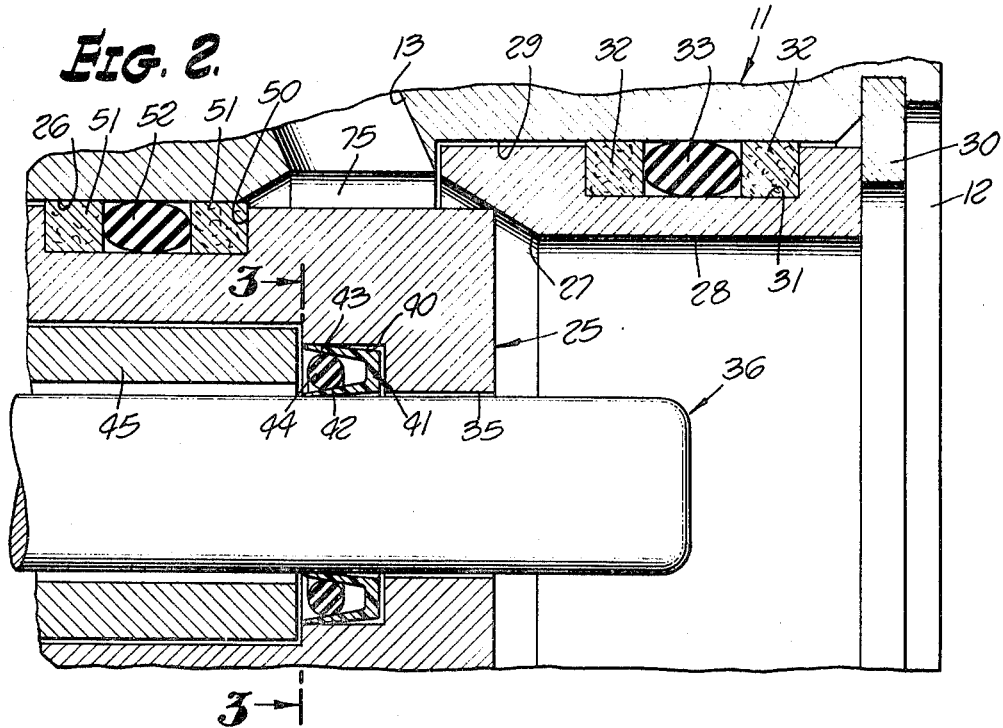
FIG. 2 is an enlarged fragmentary view of the self-cleaning restrictive orifice.
Figure 3:
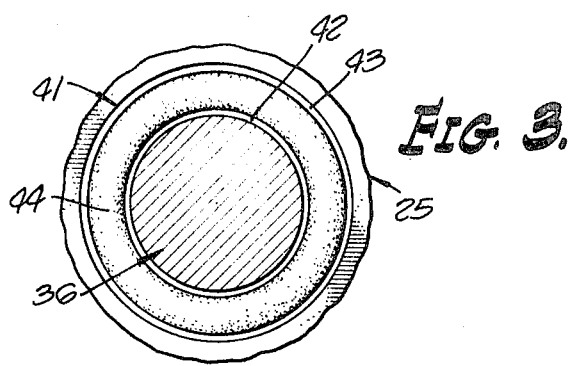
FIG. 3 is a fragmentary view taken along line 3—3 on FIG. 2.

As is best shown in FIG. 2, the bottom of the main relief valve 25 is provided with a stepped axial bore 35. Extending loosely through this bore is the cylindrical plunger 36 having its inner end 37 normally bearing against pilot valve 18 under the influence of a light compression spring 38. The enlarged inner end 40 of stepped bore 35 seats a generally V-shaped resilient wiper ring 41 having sharp-edged outwardly flaring inner and outer lips 42, 43 urged away from one another by a spring ring 44. The latter ring may comprise an O-ring and acts to press inner lip 42 against the side of plunger 36 and outer lip 43 outwardly against the sidewall of bore 40. A well known type of metallic garter spring with canted convolutions also provides similar highly satisfactory results. Normally the pressure on the opposite axial sides of wiper ring 41 is substantially the same with the result that the lips are engaged with their respective sealing surfaces. However, if the pressure to the left of ring 41 decreases, then the higher pressure to the right of the ring dilates lip 42 outwardly allowing fluid to flow through the very narrow annular flow orifice provided between bore 35 and the sidewall of plunger 36. From the foregoing it will be recognized that the resilient lip 42 of the wiper ring seal 41 and bore 35 cooperate with plunger 36 to provide a variable area dilating orifice bypassing the main relief valve 25.

Wiper ring 41 is held against displacement along bore 40 by a flanged sleeve 45 hold seated against the rim of bore 40 by the main valve compression spring 47.

The sidewall of the main piston valve 25 is provided with a wide groove 50 seating suitable packing 51 and an O-ring seal 52. The left-hand end of valve housing 11 may be closed in any suitable manner, as by a deep cup-shaped end cap 55 telescoping loosely over the exterior of the main housing. This cap may be held in assembled positioned as by a snap ring 57 supported in a groove 58 of the main housing and seating in an inwardly opening groove 59 at the forward end of the end cap. The exterior midportion of the main housing and the adjacent rim edge of the end cap may be slotted lengthwise thereof, as is indicated at 60, to provide flow passage for fluid escaping past pilot valve 18. This flow escapes through channels 21 of adjusting nut 20 and then through the narrow annular passage 62 between the exterior of the valve housing and the interior of cap 55, and thence through the escape passages 60.

As herein shown by way of example, relief valve assembly 10 is designed to telescope into a surrounding manifold, not shown, but having a close sliding fit with the cylindrical exterior surfaces 65, 65 of the valve housing. Grooves 66, 66 formed in the exterior of the valve housing seat sealing rings 67, 67 and cooperate with the manifold housing to provide a receiving chamber for fluid escaping from discharge ports 13 and 60. Valve assembly 10 is held assembled to the unshown manifold housing by threads 69 on end cap 55.

OPERATION

The described relief valve assembly is suitable for use to control fluid pressures over a wide range it merely being necessary to select a calibrated spring 19 of appropriate strength for pilot valve 18. The described valve is particularly suitable for controlling higher pressures in the range of 1,000 to 10,000 p.s.i. with high flow capacity in a very small lightweight package.

Normally both pilot valve 18 and main valve 25 are seated in the positions shown in the drawing. Under these conditions the pressure in equalizing chamber 70 between the main and pilot valve will be substantially the same but slightly less than the pressure in fluid inlet chamber 12. It will therefore be recognized that, normally the pressure on the opposite ends of plunger 36 to either side of wiper ring 41 will be substantially equalized. Accordingly, the plunger will be positioned as shown with its inner end bearing against pilot valve 18.

If and as the pressure in the system increases some flow will take place through orifice 35 and past lip 42 of the wiper ring 41. Whenever the inlet fluid pressure exceeds the desired relief pressure spring 19 is overcome allowing pilot valve 18 to unseat thereby quickly releasing fluid from chamber 70 for escape past ball valve 18. Only slight flow is necessary to substantially reduce the pressure in chamber 70. Owing to the restrictive flow capacity of orifice 35 and dilating seal 41, the pressure unbalance across main valve 25 is maintained with the result that the high system pressure in inlet chamber 12 quickly unseats valve 25. Additionally, the increased pressure differential across the main valve acts on plunger 36 to expedite wide opening of the pilot valve. The leftward movement of plunger 36 is limited by flange 72 abutting stop 73. Likewise, opening movement of main valve 25 is limited by the inner end of this valve striking stop 74. The annular chamber 75 surrounding the forward end of valve 25 allows full flow of the fluid and quick relief of the high-pressure conditions within the main system, the excess fluid escaping from chamber 75 through discharge ports 13.

During the initial opening movement of pilot valve 18 it will be apparent that the high pressure acting on the right hand end of plunger 36 forces this plunger to reciprocate leftward as the lip of the resilient plastic ring 41 wipes its surface clear of any contaminants. Subsequent axial movement of valve 25 relative to plunger 36 also facilitates the removal of any particulate from orifice 35. This ring may be made of any suitable tough, long-wearing, low-friction plastic, tetrafluroethylene being typical and particularly suitable and readily available in the market place under the trade name Teflon. When the pressure has been relieved to a level equivalent to the strength of spring 19, the latter will close the pilot valve 18 and restore plunger 36 to its original position as lip 42 of the ring 41 again wipes its surface. As pilot valve 18 seats, continued flow through orifice 35 quickly reestablishes the system pressure in equalizing chamber 70 aiding spring 47 in quickly reseating main valve 25. During the reseating movement, the valve engages seat 27 and shifts the floating valve seat sleeve 28 to any slight extent necessary to provide firm precision seating of the valve.

While the particular pilot-controlled pressure relief valve herein shown and disclosed in detail is fully capable of attaining the objects and providing the advantages hereinbefore stated, it is to be understood that it is merely illustrative of the presently preferred embodiment of the invention, and that no limitations are intended to the details of construction or design herein shown other than as defined in the appended claims.

I claim:

1. A pilot-controlled pressure relief valve comprising a main housing provided with valve seat means between a fluid inlet and a fluid outlet, main valve means including spring means normally holding the same seated against said valve seat means, pilot valve means on the downstream side of said main valve means including calibrated spring means normally holding the same seated until the fluid pressure in said fluid inlet exceeds the strength of said calibrated spring, means providing a normally closed fluid passage between the inlet sides of said main and pilot valve means and including elongated rigid means having a loose fit in said fluid passage with one end exposed to the fluid inlet pressure and the other end positioned for contact with the inlet side of said pilot valve means, the loose fit of said rigid means in said fluid passage providing a restricted inlet orifice to said pilot valve past said main valve means, and resilient wiper means operable to clean a sidewall of said inlet orifice as said rigid means moves to and for therethrough during opening and closing of said pilot valve.

2. A relief valve as defined in claim 1 characterized in that said fluid passage comprises an axial bore through said main valve means, and said rigid means comprising a plunger extending through said bore and of slightly smaller diameter thereby providing a radially narrow annular flow orifice having a length corresponding to the length of said bore.

3. A relief valve as defined in claim 2 characterized in that said resilient wiper means comprises a plastic ring of V-shape in cross section providing a pair of resilient lips flaring axially of said plunger and toward said pilot valve with its inner lip bearing inwardly against the surface of said plunger and its outer lip bearing outwardly against an annular surface of said main valve means.

4. A relief valve as defined in claim 3 characterized in the provision of annular spring means nested between the flaring lips of said plastic ring and effective to flare the same radially away from one another.

5. A relief valve as defined in claim 2 characterized in that said resilient wiper means has a sharp edge in resilient annular contact with a sidewall of said annular flow orifice and effective to wipe the same free of any foreign particles as said plunger moves to and fro along said bore during the opening and closing movements of said pilot and main valve means.

6. A relief valve as defined in claim 5 characterized in that said resilient wiper means is normally effective to close said annular flow orifice but opens in response to a low pressure differential thereacross.

7. A relief valve as defined in claim 6 characterized in that the low pressure differential across said wiper ring means acts on the end of said plunger exposed to the fluid inlet pressure to urge said plunger toward contact with said pilot valve.

8. A relief valve as defined in claim 1 characterized in that said valve seat means comprises a short self-centering sleeve having a valve seat at one end and slightly smaller in diameter than the juxtaposed interior sidewall of said main housing, means providing a fluidtight seal between the exterior of said sleeve and said main housing while permitting the valve seat end of said sleeve to shift into accurate full seating engagement with the rim of said main valve, and means for holding said sleeve movably assembled to said main housing.

9. A pilot-controlled pressure relief valve comprising a tubular main housing having an annular enlargement at one end thereof, means centrally of said housing providing a relatively small diameter pilot valve seat, means including a calibrated spring holding a pilot valve seated on said seat, a piston type main valve of uniform diameter equipped with resilient sealing ring means having a close sliding fit with the interior of said main housing adjacent said one end and remote from said pilot valve, valve seat means in said annular enlargement of said housing having a seat positioned to seat against the rim edge of the main valve, said valve seat means comprising a sleeve having a valve seat positioned to engage the rim of said main valve and the exterior of said sleeve including resilient sealing ring means holding the same floatingly assembled within said annular enlargement of said main housing in a fluidtight manner relative to the adjacent inner sidewall of said housing, a stepped axial bore through the end of said main valve loosely fitting about an elongated plunger having one end terminating adjacent said pilot valve and the other end terminating substantially beyond the end of the bore in said main valve providing a flow orifice past said main valve, said orifice being effective to substantially equalize the fluid pressure on the opposite ends of said main valve when said pilot valve is closed and effective to restrict fluid flow through said orifice to a rate very substantially less than the flow past said pilot valve when the latter is open whereby the resulting rapidly increasing pressure differential between the opposite ends of said piston type main valve is effective to open the latter, and spring means operable to reseat said main valve following closing of said pilot valve and the decay of the pressure differential across said main valve resulting from fluid flow through said orifice.

10. A relief valve as defined in claim 9 characterized in the provision of resilient wiper and fluid seal means encircling said plunger and having inner and outer annular lips bearing respectively against the side of said plunger and the side of said stepped bore and providing a normally closed annular flow orifice past said main valve and into the chamber between said main valve and said pilot valve.

11. A relief valve as defined in claim 9 characterized in that the interior of said main housing includes an annular flow passage surrounding said main valve immediately adjacent said valve seat means, and fluid outlet port means opening through said main housing from said annular flow passage.

12. A relief valve as defined in claim 11 characterized in the provision of end cap means held assembled about the pilot valve end of said tubular main housing and provided with flow passage means for conducting fluid flowing past said pilot valve and conducting the same back to an area in proximity to said fluid outlet port means for the main valve.

13. A relief valve as defined in claim 12 characterized in the provision of sealing ring seating grooves encircling the exterior of said end cap means and said main housing and cooperable with sealing rings mounted therein to support said relief valve in a housing shaped to receive fluid flow from both said main and pilot valves.